United States Patent
Pan et al.

(10) Patent No.: US 11,048,851 B2
(45) Date of Patent: Jun. 29, 2021

(54) STRETCHABLE ELECTRONICS GENERATING APPARATUS AND LAYOUT METHOD THEREOF

(71) Applicant: Industrial Technology Research Institute, Hsinchu (TW)

(72) Inventors: Cheng-Ta Pan, Kaohsiung (TW); Hung-Hsien Ko, Hsinchu County (TW); Cheng-Chung Lee, Hsinchu (TW); Chang-Ying Chen, Hsinchu County (TW); Wen-Yung Yeh, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/686,215

(22) Filed: Nov. 18, 2019

(65) Prior Publication Data
US 2020/0159982 A1 May 21, 2020

Related U.S. Application Data

(60) Provisional application No. 62/770,138, filed on Nov. 20, 2018.

(51) Int. Cl.
*G06F 30/394* (2020.01)
*H05K 1/02* (2006.01)
(Continued)

(52) U.S. Cl.
CPC ......... *G06F 30/394* (2020.01); *H05K 1/0283* (2013.01); *H05K 3/0005* (2013.01); *G06F 2115/12* (2020.01)

(58) Field of Classification Search
CPC . G06F 30/394; G06F 2115/12; H05K 1/0283; H05K 3/0005
(Continued)

(56) References Cited

U.S. PATENT DOCUMENTS 10,055,530 B1 *  8/2018  Sinivaara .............. B29C 64/393
10,209,206 B2    2/2019  Barak et al.
(Continued)

FOREIGN PATENT DOCUMENTS

| CN | 105718621 | 6/2016 |
| TW | 200712969 | 4/2007 |
| TW | I470464 | 1/2015 |

OTHER PUBLICATIONS

"Office Action of Taiwan Counterpart Application", dated Sep. 11, 2020, p. 1-p. 5.
(Continued)

*Primary Examiner* — Suresh Memula
(74) *Attorney, Agent, or Firm* — JCIPRNET

(57) ABSTRACT

A stretchable electronics generating apparatus and layout method thereof are provided. The layout method includes: establishing a layout database, wherein the layout database recodes a plurality of layout selection information respectively corresponding to a plurality of strain/stress information; detecting a layout target area to obtain a strain/stress distribution status of the layout target area; generating a wire routing information according to the strain/stress distribution status based on the layout database; and transporting the wire routing information to a manufacture device of the conductive wires for disposing a plurality of physical conductive wires on the layout target area by the manufacture device.

25 Claims, 5 Drawing Sheets

(51) Int. Cl.
*H05K 3/00* (2006.01)
*G06F 115/12* (2020.01)

(58) Field of Classification Search
USPC ........................................................ 716/137
See application file for complete search history.

(56) References Cited

U.S. PATENT DOCUMENTS

| | | | |
|---|---|---|---|
| 2004/0139419 A1* | 7/2004 | Jiang | B24B 37/042 |
| | | | 716/108 |
| 2007/0204250 A1* | 8/2007 | Moroz | G06F 30/39 |
| | | | 716/55 |
| 2011/0185326 A1* | 7/2011 | Ueda | G06F 30/367 |
| | | | 716/112 |
| 2018/0314783 A1* | 11/2018 | Moroz | G06F 30/367 |
| 2020/0311223 A1* | 10/2020 | Shibata | G06F 30/392 |

OTHER PUBLICATIONS

Terry C. Shyu et al., "A kirigami approach to engineering elasticity in nanocomposites through patterned defects", Nature Materials, vol. 14, Jun. 22, 2015, pp. 785-790.

Naoji Matsuhisa et al., "Printable elastic conductors with a high conductivity for electronic textile applications", Nature Communications, vol. 6, No. 7461, Jun. 25, 2015, pp. 1-11.

Yung-Yu Hsu et al., "Archipelago platform for skin-mounted wearable and stretchable electronics", 2014 IEEE 64th Electronic Components and Technology Conference, May 27-30, 2014, pp. 145-150.

Murat A. Yokus et al., "Printed Stretchable Interconnects for Smart Garments: Design, Fabrication, and Characterization", IEEE Sensors Journal, vol. 16, No. 22, Nov. 15, 2016, pp. 7967-7976.

Dae-Hyeong Kim et al., "Materials and noncoplanar mesh designs for integrated circuits with linear elastic responses to extreme mechanical deformations", PNAS, vol. 105, No. 48, Dec. 2, 2008, pp. 18675-18680.

Qiao Li et al., "A stretchable knitted interconnect for three-dimensional curvilinear surfaces", Textile Research Journal, vol. 81, No. 11, Jul. 2011, pp. 1171-1182.

* cited by examiner

STRETCHABLE ELECTRONICS GENERATING APPARATUS AND LAYOUT METHOD THEREOF

CROSS-REFERENCE TO RELATED APPLICATION

This application claims the priority benefit of U.S. provisional application Ser. No. 62/770,138, filed on Nov. 20, 2018. The entirety of the above-mentioned patent application is hereby incorporated by reference herein.

BACKGROUND

Technical Field

The disclosure relates to a stretchable electronics generating apparatus and a layout method thereof, and particularly relates to a generating apparatus and a layout method to dispose stretchable electronics on flexible materials.

Description of Related Art

With the advancement of electronic technology, electronic products have become essential tools in everyday life. In emerging electronic products, electronic components are no longer necessarily disposed on a rigid circuit board, but may be disposed on soft (flexible) objects of various materials such as clothing, paper, etc. to perform various functions.

Although the conventional techniques provide multiple methods for disposing conductive wires on flexible objects, during the flexible objects are deformed the sustainable stress/strain of conductive wires disposed on various flexible objects are different. Therefore, the reliability and lifespan of the conductive wires manufactured through conventional manufacturing process/method may vary with the mechanical properties of the conductive wires layout area. As a result, the performance of the electronic components on the flexible objects is also significantly challenged.

SUMMARY

The embodiments of the disclosure provide a stretchable electronics generating apparatus and a layout method thereof, which can enhance the reliability and lifespan of stretchable electronics.

A stretchable electronics layout method according to an embodiment of the disclosure includes the following steps. A layout database, which records a plurality of layout selection information respectively corresponding to a plurality of strain/stress information is established. Detection is performed on a layout target area to obtain a strain/stress distribution of the layout target area. According to the strain/stress distribution, wire routing information is generated based on the layout database. The wire routing information is transmitted to a conductive wire manufacturing device, so that the conductive wire manufacturing device disposes a plurality of physical conductive wires on the layout target area according to the wire routing information.

A stretchable electronics generating apparatus according to an embodiment of the disclosure includes a controller and a conductive wire manufacturing device. The controller receives a layout database, which records a plurality of layout selection information corresponding to a plurality of strain/stress information. The controller is configured to: detect strain/stress distribution of the layout target area; according to the strain/stress distribution generate the wire routing information based on the layout database; and transmit the wire routing information to the conductive wire manufacturing device. The conductive wire manufacturing device is coupled to the controller and disposes a plurality of physical conductive wires on a layout target area according to the wire routing information.

Based on the above, in the stretchable electronics layout method of the embodiments of the disclosure, with the established layout database, wire routing information is generated according to the strain/stress distribution of the layout target area. The conductive wire manufacturing device generates physical conductive wires on the layout target area according to the wire routing information. Accordingly, the generated physical conductive wires can be appropriately adjusted according to the strain/stress distribution of the layout target area to effectively enhance the reliability of the physical conductive wires To make the disclosure more comprehensible, embodiments will be described in detail below with reference to the accompanying drawings.

DESCRIPTION OF THE EMBODIMENTS

Figure 1:
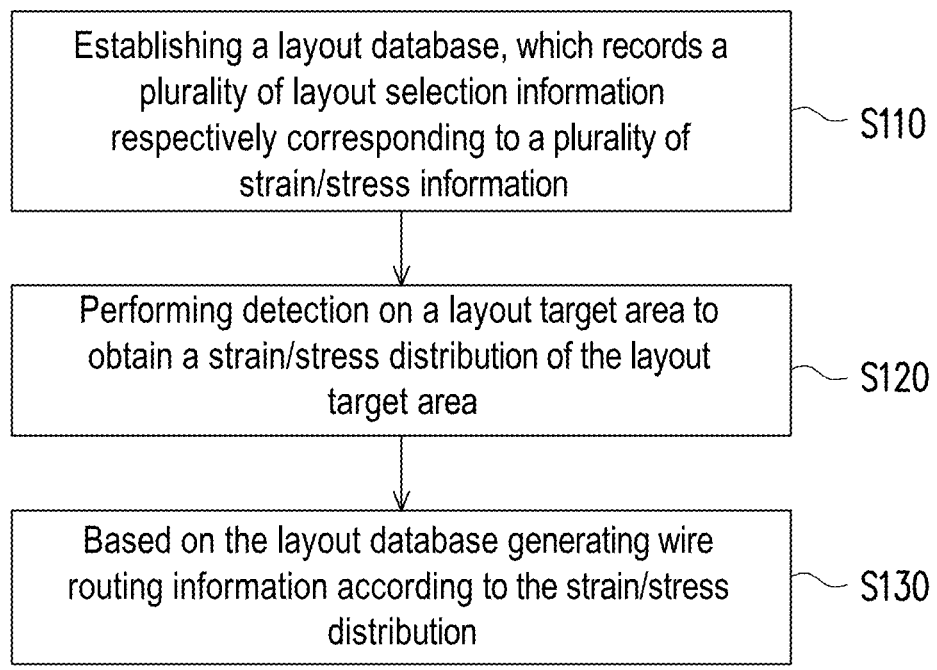
FIG. 1 shows a flowchart of a stretchable electronics layout method according to an embodiment of the disclosure.

Referring to FIG. 1, it shows a flowchart of a stretchable electronics layout method according to an embodiment of the disclosure. In FIG. 1, step S110 is performed to establish a layout database, which records a plurality of layout selection information respectively corresponding to a plurality of strain/stress information. The layout database may perform at least one of the following: recording a plurality of conductive wire types respectively corresponding to the strain/stress information and a plurality of physical properties respectively corresponding to the conductive wire types, recording a plurality of conductive wire sizes respectively corresponding to the strain/stress information, and recording a plurality of carrier substrate information respectively corresponding to the strain/stress information. Each of the conductive wire types includes a plurality of conductive wire materials, and each of the conductive wires includes at least one of following the physical properties: stretchable directions, maximum tensile strain, and resistance change rate, but the disclosure is not limited thereto. The conductive wire sizes include at least one of the following form factors: wire width, wire pitch, wire height, and wiring density, etc., but is not limited thereto.

Regarding the conductive wire types, for example, the conductive wire types in the embodiments of the disclosure include any stretchable conductive wires known to those skilled in the art, such as conductive wires with a slit structure, a plurality of different stretchable conductive wires with different materials, conductive wires formed with serpentine circuits, three-dimensional conductive wires configured in a non-coplanar pre-strained structure, a conductive fiber, etc. For the records of the conductive wire types, the contents of the layout database may be as shown in Table 1 below:

TABLE 1

| | Type | | | | | |
|---|---|---|---|---|---|---|
| | Slit structure | Conductive fiber | Non-coplanar pre-strained structure | Offset serpentine wire | Serpentine wire | Stretchable conductive material |
| Stretchable direction | Multiaxial | Uniaxial | Biaxial | Uniaxial | Uniaxial | Biaxial |
| Maximum tensile strain A | 200% | 200% | 100% | 50% | 20% | 10% |
| Maximum stress | 11 MPa | 11 MPa | 7 MPa | 6 MPa | 2 MPa | 0.4 MPa |
| Resistance change rate B | <5% | <10% | — | <10% | — | <100% |
| Control parameter | L/x (L: slit length; x: slit pitch) | Amount of Lycra spandex, weaving method | Pre-strained value | Offset width | Wire width, wire thickness, crest width | Stretchable materials such as stretchable silver paste, PEDOT, etc. |

In Table 1, the maximum tensile strain A indicates the tensile strain that results in a resistance change rate of 10% as one single stretching operation is performed. The resistance change rate B indicates the resistance change rate generated as the tensile strain of 10% is performed multiple times (e.g., 100 times). MPa represents million Pascal. The control parameters are essential parameters in the design of a structure or a material of a stretchable conductive wire under different tensile stress conditions.

The contents of the conductive wire types and the relevant physical properties in Table 1 are only examples intended for illustration. The layout database in the embodiments of the disclosure is not limited to recording the above conductive wire types, and the physical properties corresponding to the conductive wire types may also be the same as or different from the values in Table 1.

In addition, the above carrier substrate information includes a carrier substrate structure and a carrier substrate material. As the carrier substrate is designed with a slit structure, the carrier substrate structure may further include at least one of the following form factors: a slit size, a slit shape, and a slit density. Moreover, the carrier substrate structure may further include a substrate aperture ratio.

On the other hand, when a conductive wire layout is performed on a layout target area with fabric, the layout database may further record a knitting state and a fiber cross-section dimension of the fabric.

The layout database in the embodiments of the disclosure may record the plurality of conductive wire types, the corresponding physical properties, and the relevant information of the carrier substrates in an exhaustive manner. On the other hand, in other embodiments of the disclosure, the layout database may record part of the information to save the memory space required for the layout database.

Next, in step S120, detection is performed on a layout target area to obtain a strain/stress distribution of the layout target area. Regarding the detection operation of the strain/stress distribution of the layout target area, the layout target area may be divided into a plurality of zones, and a plurality of stresses may be applied to the zones. Moreover, by detecting a plurality of strains generated according to the stresses in each of the zones, the strain/stress distribution is obtained.

Figure 2A:
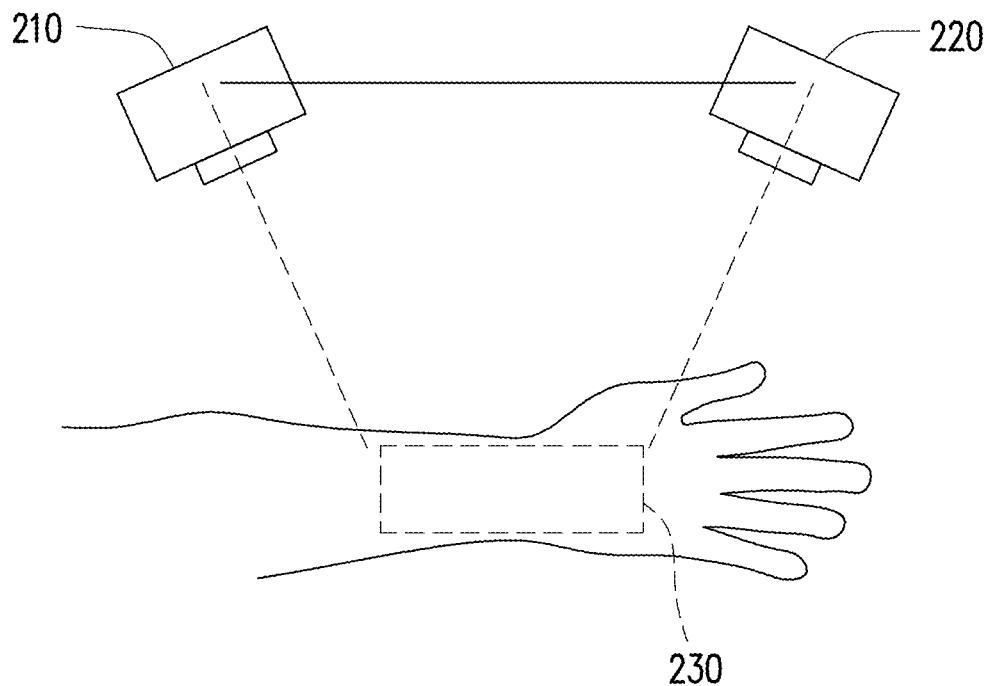
FIG. 2A and FIG. 2B are schematic views showing a method of detecting strain/stress distribution of a layout target area according to an embodiment of the disclosure.
Figure 2B:
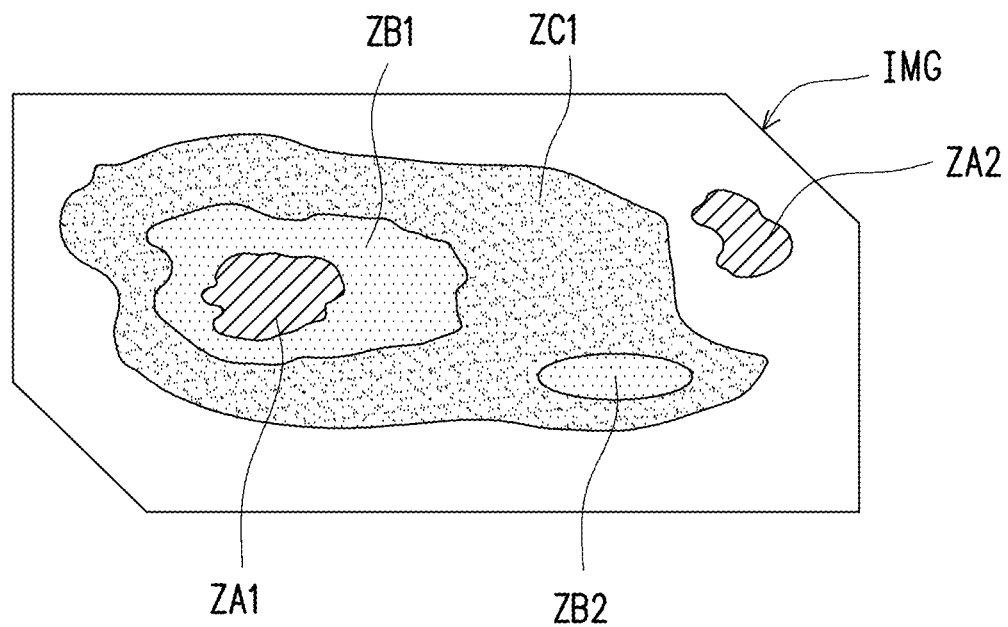

Referring to FIG. 2A and FIG. 2B, they are schematic views showing a method of detecting the strain/stress distribution of the layout target area according to an embodiment of the disclosure. In FIG. 2A, a layout target area 230 is an area on a human arm. When the detection operation of the strain/stress distribution is performed, a plurality of stresses may be applied to a plurality of zones on the layout target area 230. Cameras 210 and 220 may perform a multi-angle image capturing operation on the layout target area 230 to obtain an image IMG as shown in FIG. 2B. Based on the strains generated on the layout target area 230 caused from the applied stresses, the image IMG has a plurality of different zones with different strains (e.g., greyscale image) ZA1, ZA2, ZB1, ZB2, and ZC1. Specifically, zones ZA1 and ZA2 represent zones having a same first strain, zones ZB1 and ZB2 represent zones having a same second strain, and a zone ZC1 represents a zone having a third strain. In the present embodiment, the first strain is, for example, greater than the second strain, and the second strain is, for example, greater than the third strain.

According to the image IMG, through the detection operation of the strain/stress distribution, the strain/stress distribution of the layout target area 230 generated under different stress conditions can be obtained.

Figure 3A:
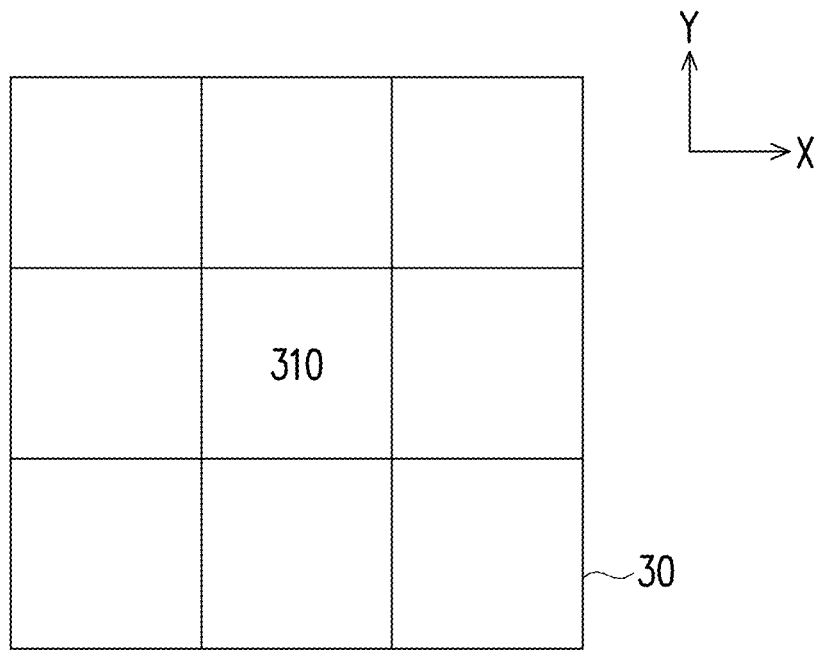
FIG. 3A is a schematic view showing an object 30 not subjected to stresses according to an embodiment of the disclosure.
Figure 3B:
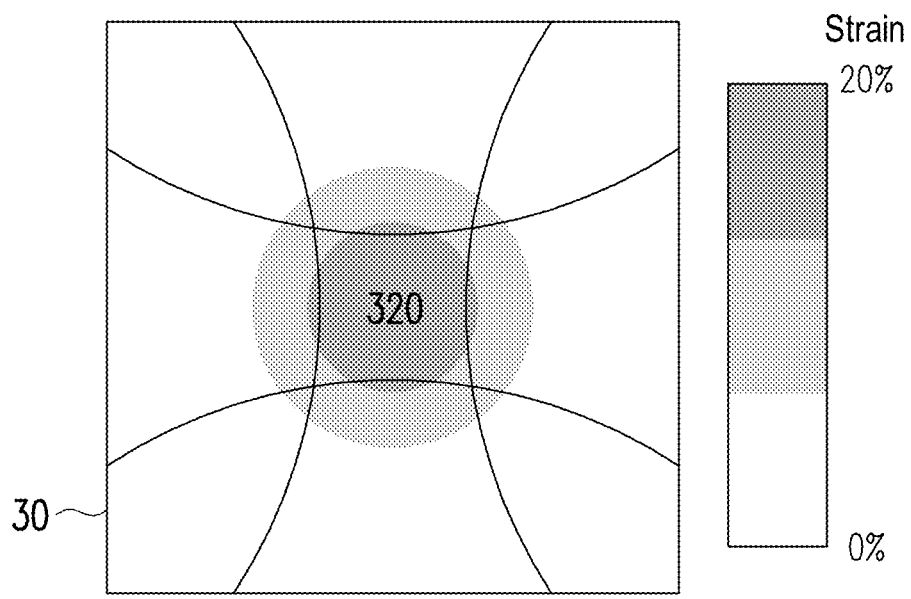
FIG. 3B is a schematic view showing the object 30 subjected to stresses according to an embodiment of the disclosure.

For further implementation details of the detection operation of the strain/stress distribution, reference may be made to FIG. 3A and FIG. 3B. FIG. 3A is a schematic view showing an object 30 not subjected to stresses according to an embodiment of the disclosure. First, a two-dimensional image with marks of the object 30 on an X-Y plane is obtained. Taking FIG. 3A for example, nine marked regions of the two-dimensional image on the X-Y plane of the object 30 may be generated, and the nine marked regions include a marked region 310.

Then, a test stress may be applied to the object 30 to generate strain applied to each marked region. For example, the user may apply a fixed test stress to the object 30 by using a device such as a robotic arm or a tensile testing machine or any other ways in an actual application field. Alternatively, the test stress may be first simulated through calculation (e.g., by using a controller having computing capability), and then the test stress may be applied to the object 30.

FIG. 3B is a schematic view showing the object 30 subjected to a test stress according to an embodiment of the disclosure. After the test stress is applied to the object 30, the two-dimensional image of the object 30 as shown in FIG. 3A will be converted into a dimensional image as shown in FIG. 3B, and the dimensional image is, for example, a three-dimensional image of the object 30, but the disclosure is not limited thereto. Compared to the two-dimensional image of the object 30, the three-dimensional image of the object 30 further includes relevant information corresponding to a Z axis, and the Z axis perpendicular to the X-Y plane represents the degree of strain of the object 30 after the test stress is applied to the object 30. In other words, after the test stress is applied to the object 30, the two-dimensional image of the object 30 may be converted into a three-dimensional image including the strain information of the object 30.

When the two-dimensional image of the object 30 is converted into the three-dimensional image including the strain information of the object 30, the shape of the marked region 310 is changed and transformed into a strain marked region 320 corresponding to the three-dimensional image. A controller may calculate the strain of the region 310 after the test stress is applied to the object 30 according to deformation from the marked region 310 to the marked region 320. According to the calculated strain and a first elastic modulus corresponding to the object 30 (or corresponding to the marked region 310), the controller may further compute the stress applied to the marked region 310 as a first stress and generate a corresponding determination result. For example, the controller may plot a stress-strain curve corresponding to the object 30 according to the first elastic modulus and compute the stress applied on the object 30 according to the calculated strain and the stress-strain curve plotted with the first elastic modulus.

Next, the controller may calculate a stress distribution of the two-dimensional image corresponding to the object 30 according to the determination result. The controller may determine the strain of the marked region 310 after being subjected to the first stress according to the deformation from the marked region 310 to the marked region 320 and thereby calculate the stress applied to the marked region 310 as the first stress. The controller may accordingly determine stresses at any point on the marked region 320 after the first stress is applied. In a similar manner, the controller may calculate the stress distribution applied to each point in the two-dimensional image of the object 30.

Figure 4A:
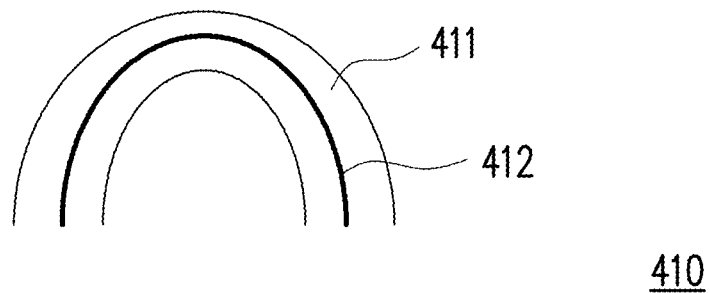
FIG. 4A to FIG. 4C are schematic views respectively showing embodiments of different conductive wire types of the disclosure.
Figure 4B:
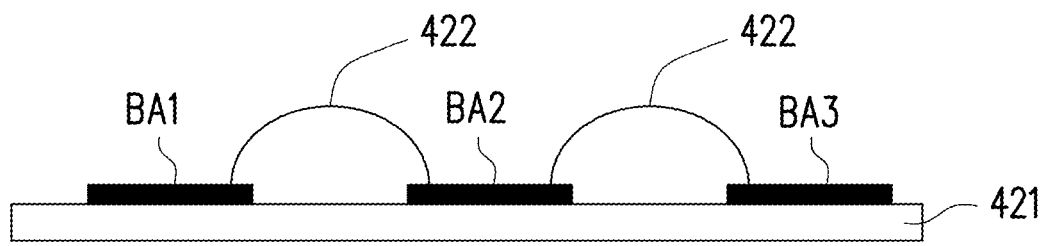
Figure 4C:
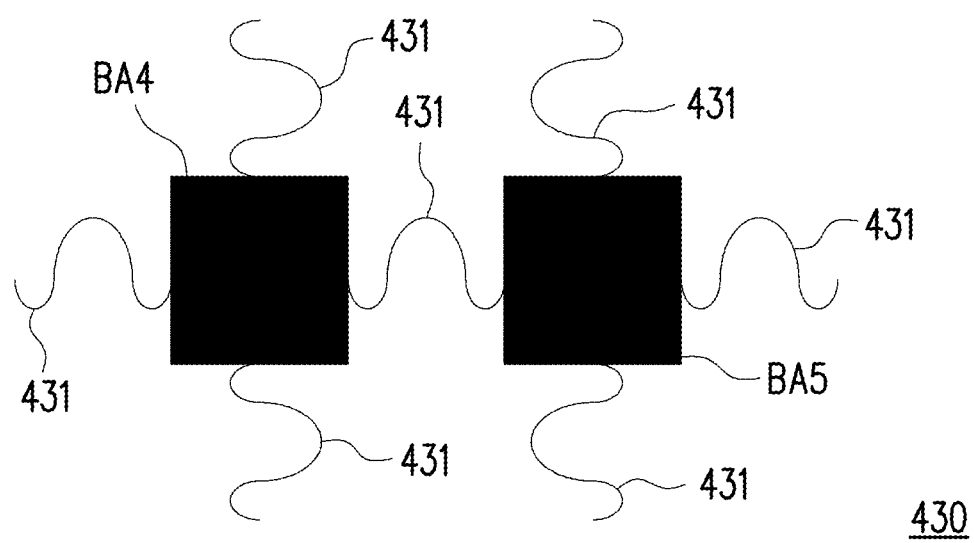

Referring to FIG. 4A to FIG. 4C, they are schematic views respectively showing embodiments of different conductive wire types of the disclosure. FIG. 4A is a top view of an offset serpentine conductive wire. In a conductive wire type 410, a serpentine conductive wire 412 is disposed on a serpentine carrier substrate 411. FIG. 4B is a side view of a conductive wire of a non-coplanar pre-strained structure. In a conductive wire type 420, a conductive wire 422 is disposed above a carrier substrate 421 and bridges between two nodes on the carrier substrate 421 in an arc shape. The conductive wire 422 forms a spring-like structure to enhance the stretchability of the wire. FIG. 4C is a top view of the bridged conductive wire in FIG. 4B. In a conductive wire type 430, a conductive wire 431 is connected between a plurality of nodes in a bridged manner to enhance the stretchability of the wire. In FIG. 4B and FIG. 4C, black block elements BA1 to BA5 may be components or devices such as electrodes, passive electronic components, active electronic components, integrated circuits, etc.

The conductive wire types shown from FIG. 4A to FIG. 4C are only examples intended for the illustration. Other conductive wire types with stretchable properties known to those skilled in the art may also be applied to the embodiments of the disclosure, and the disclosure is not particularly limited in this regard.

Referring to the step 130 in FIG. 1 and above description, wire routing information based on the layout database is generated according to the strain/stress distribution, and the wire routing information includes a material and a layout configuration of the conductive wires. Regarding the implementation details of step S130, after the strain/stress distribution of the layout target area is obtained, in the embodiment of the disclosure, the layout design of a conductive wire structure and a material may be selected in the zones with different strain/stress. Moreover, the conductive wire layout configuration on the zones with different strain/stress status is selected. For example, when the zone has a relatively high strain/stress, a conductive wire structure or material with relatively high stretchability may be selected. Conversely, when the zone has a relatively low strain/stress, the stretchability of a conductive wire material may not serve as the basis for selecting a conductive wire, and a conductive wire with a conventional material or structure may be selected. In addition, if stable electrical characteristic of the conductive wires in the layout target area is required and the zone has a relatively high strain/stress, a stretchable conductive wire material with relatively low resistance change rate may be preferentially selected. Conversely, if stable electrical characteristic of the conductive wires in the layout target area is not required, the resistance change rate of the conductive wires may not serve as a condition to be preferentially considered, and a conductive wire with a conventional material or structure may also be selected for the high strain/stress zone.

As for the conductive wire layout configuration, the layout configuration may include a layout density of conductive wire in different zones. For example, when a first zone in the layout target area has a first strain/stress distribution, a second zone in the layout target area has a second strain/stress distribution, and the first strain/stress distribution is higher than the second strain/stress distribution, a first conductive wire layout density in the first zone may be selected to be lower than a second conductive wire layout density in the second zone. In some embodiments of the disclosure, in a first zone with relatively high first strain/stress distribution, it is possible not to perform any layout of conductive wire.

The conductive wire layout configurations may further include a substrate. In addition, a corresponding textile design of the conductive fibers may also be performed for a stress concentrated zone.

Next, the wire routing information generated in the above step may be transmitted to a conductive wire manufacturing device, so that the conductive wire manufacturing device disposes a plurality of physical conductive wires on the layout target area according to the wire routing information. The wire routing information may be transmitted to the conductive wire manufacturing device on-line or off-line. The conductive wire manufacturing device then disposes physical conductive wires and performs wire layout according to the wire routing information.

The conductive wire manufacturing device may determine the part that may be difficult or impossible to complete a process of generating the physical conductive wires according to the wire routing information and accordingly generate manufacturing limitation information. The conductive wire manufacturing device returns the manufacturing limitation information to the controller, so that the controller can adjust the wire routing information according to the manufacturing limitation information and thereby optimize the layout of the stretchable electronics.

In addition, after the production of the physical conductive wires is completed, in an embodiment of the disclosure, a measuring device may be provided to measure one or more physical properties (e.g., electrical properties) of the physical conductive wires. Moreover, the measured result is compared with the expected result of the design. If the measured result does not match the expected result of the design, feedback adjustment information may be generated and returned to the controller. From the feedback adjustment information, the controller can adjust the wire routing information. In some embodiments of the disclosure, the layout of the stretchable electronics may also be updated or the contents of the layout database may be updated according to the feedback adjustment information.

Figure 5:
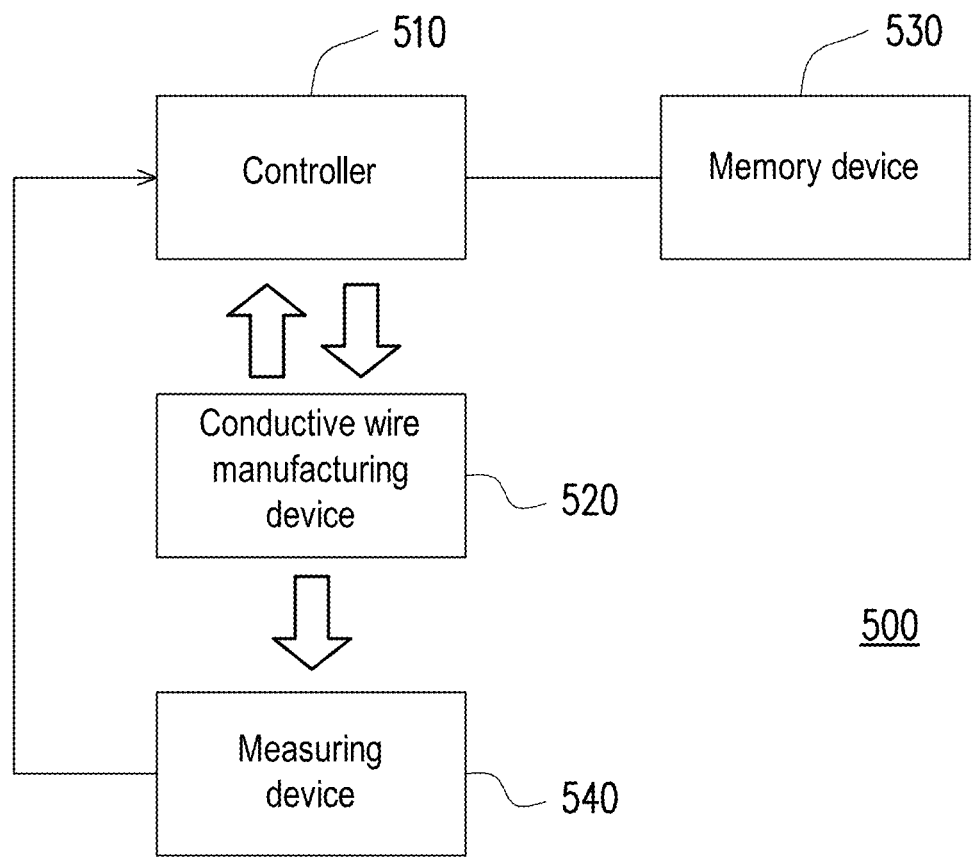
FIG. 5 is a schematic view showing a stretchable electronics generating apparatus according to an embodiment of the disclosure.

Referring to FIG. 5, FIG. 5 is a schematic view showing a stretchable electronics generating apparatus according to an embodiment of the disclosure. A stretchable electronics generating apparatus 500 includes a controller 510, a conductive wire manufacturing device 520, a measuring device 540, and a memory device 530. The controller 510 receives a layout database, which records a plurality of layout selection information respectively corresponding to a plurality of strain/stress information. The memory device 530 is coupled to the controller 510 and is configured to provide the layout database. The conductive wire manufacturing device 520 is coupled to the controller 510. The conductive wire manufacturing device 520 disposes a plurality of physical conductive wires on a layout target area according to wire routing information. The conductive wire manufacturing device 520 may also return manufacturing limitation information to the controller 510, so that the controller 510 can adjust the wire routing information and thereby generate adjusted wire routing information.

In the present embodiment, the memory device 530 may be externally connected to the controller 510 or built in the controller 510. The memory device 530 may be a memory in any form and may also be a medium in any form capable of storing information, such as a hard disk, an optical disk, etc. The controller 510 may be a processor with computation capability. Alternatively, the controller 510 may be designed through a hardware description language (HDL) or any other digital circuit design method familiar to those skilled in the art, and may be a hardware circuit implemented through a field programmable gate array (FPGA), a complex programmable logic device (CPLD), or an application-specific integrated circuit (ASIC).

In addition, the conductive wire manufacturing device 520 may return the manufacturing limitation information to the controller 510 according to the actual production condition. The controller 510 may adjust the wire routing information according to the manufacturing limitation information and store the adjusted wire routing information back to the memory device 530. Accordingly, the conductive wire manufacturing device 520 can further complete the production of the physical conductive wires according to the adjusted wire routing information.

The measuring device 540 is configured to measure one or more physical properties (e.g., electrical properties) of each of the physical conductive wires. The measuring device 540 may compare the measured result with the expected result of the design. If the measured result does not match the expected result of the design, feedback adjustment information may be generated. The feedback adjustment information may be returned to the controller 510, and the controller 510 can adjust the wire routing information according to the feedback adjustment information. In some embodiments of the disclosure, the layout of the stretchable electronics or the contents of the layout database may be updated according to the feedback adjustment information.

In addition, the controller 510 may generate the wire routing information by executing an application. The application may be optimized through machine learning operations based on artificial intelligence. In the disclosure, the application may use a neural network or a fuzzy algorithm, for example, to perform a self-learning operation.

The conductive wire manufacturing device 520 and the controller 510 may perform information transmission via a near-end or far-end connection. Alternatively, the conductive wire manufacturing device 520 and the controller 510 may also perform data transmission with each other in an off-line manner, and the disclosure is not particularly limited in this regard.

In summary, in the disclosure, the layout database records a plurality of layout selection information respectively corresponding to a plurality of strain/stress information, and the strain/stress distribution of the layout target area is detected. According to the strain/stress distribution of the layout target area, the wire routing information is generated based on the layout database, and the conductive wire manufacturing device disposes the physical conductive wires. Accordingly, the reliability and lifespan of the physical conductive wires can be effectively enhanced.

Although the disclosure has been disclosed with the embodiments above, the embodiments are not intended to limit the disclosure. Any person with ordinary skill in the art may make changes and modifications without departing from the spirit and scope of the disclosure. Therefore, the protection scope of the disclosure shall be determined by the claims attached hereafter.

What is claimed is:

1. A stretchable electronics layout method comprising:
providing a memory device for storing a layout database, wherein a plurality of layout selection information respectively corresponding to a plurality of strain/stress information was recorded in the layout database;
performing detection on a layout target area to obtain a strain/stress distribution of the layout target area by a controller, comprising:
applying a plurality of stresses to each of a plurality of zones of the layout target area, and detecting a plurality of strains of the zones generated according to the stresses to obtain the strain/stress distribution by the controller; and
according to the strain/stress distribution, generating wire routing information based on the layout database by the controller.

2. The stretchable electronics layout method according to claim 1, further comprising:
transmitting the wire routing information to a conductive wire manufacturing device, so that the conductive wire manufacturing device disposes a plurality of physical conductive wires on the layout target area according to the wire routing information.

3. The stretchable electronics layout method according to claim 2, further comprising:
 measuring a physical property of each of the physical conductive wires, and generating feedback adjustment information according to a measured result; and
 adjusting the wire routing information and/or the layout database according to the feedback adjustment information.

4. The stretchable electronics layout method according to claim 2, wherein the step of transmitting the wire routing information to the conductive wire manufacturing device, so that the conductive wire manufacturing device disposes the physical conductive wires on the layout target area according to the wire routing information further comprises:
 setting the conductive wire manufacturing device to generate manufacturing limitation information according to the wire routing information;
 adjusting the wire routing information according to the manufacturing limitation information; and
 disposing the physical conductive wires according to adjusted wire routing information.

5. The stretchable electronics layout method according to claim 1, wherein the wire routing information comprises a material of a plurality of conductive wires and a layout configuration of the conductive wires.

6. The stretchable electronics layout method according to claim 1, wherein the step of establishing the layout database, wherein the layout database records the plurality of layout selection information respectively corresponding to the plurality of strain/stress information comprises:
 recording at least one of:
  a plurality of conductive wire types corresponding to the plurality of strain/stress information, and a plurality of respectively corresponding physical properties;
  a plurality of conductive wire sizes corresponding to the plurality of strain/stress information; and
  a plurality of carrier substrate information corresponding to the plurality of strain/stress information.

7. The stretchable electronics layout method according to claim 6, wherein each of the conductive wire types comprises a plurality of conductive wire materials, and each of the physical properties comprises at least one of stretchable direction, maximum tensile strain, and tensile resistance change rate of each of the conductive wire types.

8. The stretchable electronics layout method according to claim 6, wherein each of the plurality of carrier substrate information comprises a carrier substrate structure and a carrier substrate material.

9. The stretchable electronics layout method according to claim 8, wherein the carrier substrate structure further comprises at least one of a slit size, a slit shape, a slit density, and a substrate aperture ratio.

10. The stretchable electronics layout method according to claim 6, wherein the step of establishing the layout database recording the plurality of layout selection information respectively corresponding to the plurality of strain/stress information further comprises:
 recording a knitting state and a fiber cross-section dimension of a fabric on the layout target area.

11. The stretchable electronics layout method according to claim 6, wherein the conductive wire sizes comprise at least one of a wire width, a wire pitch, a wire height, and a wiring density of the conductive wires.

12. The stretchable electronics layout method according to claim 1, wherein a layout configuration of the conductive wires comprises a first conductive wire layout density and a second conductive wire layout density, and the first conductive wire layout density and the second conductive wire layout density respectively correspond to a first strain/stress distribution and a second strain/stress distribution,
 wherein the first strain/stress distribution is higher than the second strain/stress distribution, and the first conductive wire layout density is lower than the second conductive wire layout density.

13. A stretchable electronics generating apparatus comprising:
 a controller, receiving a layout database, wherein a plurality of layout selection information respectively corresponding to a plurality of strain/stress information was recorded; and
 a conductive wire manufacturing device, coupled to the controller and disposing a plurality of physical conductive wires on a layout target area according to a wire routing information,
 wherein the controller is further configured to:
  perform detection on the layout target area to obtain a strain/stress distribution of the layout target area, wherein the controller is configured to apply a plurality of stresses to each of a plurality of zones of the layout target area, and detect a plurality of strains of the zones generated according to the stresses to obtain the strain/stress distribution;
  generate the wire routing information according to the strain/stress distribution based on the layout database; and
  transmit the wire routing information to the conductive wire manufacturing device.

14. The stretchable electronics generating apparatus according to claim 13, further comprising:
 a measuring device, measuring a physical property of each of the physical conductive wires, and generating feedback adjustment information according to a measured result,
 wherein the controller adjusts the wire routing information and/or the layout database according to the feedback adjustment information.

15. The stretchable electronics generating apparatus according to claim 13, wherein the wire routing information comprises a material of a plurality of conductive wires and a layout configuration of the conductive wires.

16. The stretchable electronics generating apparatus according to claim 13, further comprising:
 a memory device, coupled to the controller and configured to store the layout database.

17. The stretchable electronics generating apparatus according to claim 13, wherein the controller generates the wire routing information by executing an application software.

18. The stretchable electronics generating apparatus according to claim 13, wherein the plurality of layout selection information comprises at least one of:
 a plurality of conductive wire types corresponding to the plurality of strain/stress information, and a plurality of respectively corresponding physical properties;
 a plurality of conductive wire sizes corresponding to the plurality of strain/stress information; and
 a plurality of carrier substrates information corresponding to the plurality of strain/stress information.

19. The stretchable electronics generating apparatus according to claim 18, wherein each of the conductive wire types comprises a plurality of conductive wire materials, and each of the physical properties comprises at least one of a stretchable direction, a maximum tensile strain, and resistance change rate of each of the conductive wire types.

20. The stretchable electronics generating apparatus according to claim 18, wherein each of the plurality of carrier substrate information comprises a carrier substrate structure and a carrier substrate material.

21. The stretchable electronics generating apparatus according to claim 20, wherein the carrier substrate structure further comprises at least one of a slit size, a slit shape, a slit density, and a substrate aperture ratio.

22. The stretchable electronics generating apparatus according to claim 18, wherein the plurality of layout selection information further comprises at least one of a knitting state and a fiber cross-section dimension of a fabric on the layout target area.

23. The stretchable electronics generating apparatus according to claim 18, wherein the conductive wire sizes comprise at least one of a wire width, a wire pitch, a wire height, and a wiring density of the conductive wires.

24. The stretchable electronics generating apparatus according to claim 13, wherein a layout configuration of the conductive wires comprises a first conductive wire layout density and a second conductive wire layout density, and the first conductive wire layout density and the second conductive wire layout density respectively correspond to a first strain/stress distribution and a second strain/stress distribution, wherein the first strain/stress distribution is higher than the second strain/stress distribution, and the first conductive wire layout density is lower than the second conductive wire layout density.

25. The stretchable electronics generating apparatus according to claim 13, wherein the conductive wire manufacturing device further generates manufacturing limitation information according to the wire routing information, and the controller further adjusts the wire routing information according to the manufacturing limitation information and disposes the physical conductive wires according to adjusted wire routing information.

* * * * *